(12) United States Patent
Henderson et al.

(10) Patent No.: US 9,835,140 B2
(45) Date of Patent: Dec. 5, 2017

(54) POWER GENERATING SYSTEM AND HYDRAULIC CONTROL SYSTEM

(71) Applicant: WINDFLOW TECHNOLOGY LIMITED, Christchurch (NZ)

(72) Inventors: Geoffrey Morgan Henderson, Christchurch (NZ); Peter John Scott, Christchurch (NZ); Matthew James Silvester, Christchurch (NZ); Richard James Trudgian, Christchurch (NZ)

(73) Assignee: WINDFLOW TECHNOLOGY LIMITED, Christchurch (NZ)

( * ) Notice: Subject to any disclaimer, the term of this patent is extended or adjusted under 35 U.S.C. 154(b) by 712 days.

(21) Appl. No.: 14/367,738

(22) PCT Filed: Dec. 11, 2012

(86) PCT No.: PCT/NZ2012/000233
§ 371 (c)(1),
(2) Date: Jun. 20, 2014

(87) PCT Pub. No.: WO2013/095162
PCT Pub. Date: Jun. 27, 2013

(65) Prior Publication Data
US 2015/0219077 A1    Aug. 6, 2015

Related U.S. Application Data

(60) Provisional application No. 61/577,941, filed on Dec. 20, 2011.

(51) Int. Cl.
*F03D 7/02* (2006.01)
*F03D 15/00* (2016.01)
(Continued)

(52) U.S. Cl.
CPC .............. *F03D 15/00* (2016.05); *F03D 7/00* (2013.01); *F03D 7/02* (2013.01); *F03D 7/0276* (2013.01);
(Continued)

(58) Field of Classification Search
None
See application file for complete search history.

(56) References Cited

U.S. PATENT DOCUMENTS 4,198,821 A   4/1980  Moody et al.
4,239,977 A   12/1980 Strutman
(Continued)

FOREIGN PATENT DOCUMENTS

EP    0822355   2/1998
GB    1601467   10/1981
(Continued)

OTHER PUBLICATIONS

International Search Report, PCT/NZ2012/000233, dated Mar. 7, 2013.

*Primary Examiner* — Erin D Bishop
(74) *Attorney, Agent, or Firm* — Young & Thompson (57) ABSTRACT

A hydraulic control system HCS for controlling a variable ratio transmission of a power generating system. A hydraulic motor/pump unit 140 is operably connected to a superposition gear, and is connected to a hydraulic circuit that comprises an orifice 28 and/or a relief valve 29 that opens at a predetermined hydraulic pressure. The hydraulic circuit switches between a variable low-speed operating mode and a torque limiting high-speed operating mode. In the torque limiting high-speed operating mode the hydraulic motor/pump unit 140 is driven by the superposition gear and drives hydraulic fluid through the orifice 28 and/or relief valve 29 to provide a passive torque limiting function. In the variable
(Continued)

low-speed operating mode the hydraulic motor/pump unit 140 drives the superposition gear and the hydraulic control system provides a desired rotor 101 speed by controlling hydraulic fluid flow rate through the hydraulic motor/pump unit 140.

18 Claims, 9 Drawing Sheets

(51) Int. Cl.
*F03D 9/25* (2016.01)
*F03D 7/04* (2006.01)
*F16H 61/4096* (2010.01)
*F16H 61/47* (2010.01)
*F03D 7/00* (2006.01)
*F15B 1/02* (2006.01)
*F15B 1/027* (2006.01)
*F15B 15/20* (2006.01)
*F16H 47/04* (2006.01)

(52) U.S. Cl.
CPC ............... *F03D 7/04* (2013.01); *F03D 9/25* (2016.05); *F15B 1/021* (2013.01); *F15B 1/027* (2013.01); *F15B 15/202* (2013.01); *F16H 47/04* (2013.01); *F16H 61/4096* (2013.01); *F16H 61/47* (2013.01); *F05B 2260/40311* (2013.01); *F05B 2270/101* (2013.01); *F05B 2270/1014* (2013.01); *F05B 2270/327* (2013.01); *F15B 2201/411* (2013.01); *Y02E 10/722* (2013.01); *Y02E 10/723* (2013.01); *Y02P 80/158* (2015.11)

(56) References Cited

U.S. PATENT DOCUMENTS

| | | |
|---|---|---|
| 4,586,400 A | 5/1986 | Nygren |
| 4,774,855 A | 10/1988 | Murrell et al. |
| 5,140,170 A | 8/1992 | Henderson |
| 6,911,743 B2 | 6/2005 | Ishizaki |
| 7,560,824 B2 | 7/2009 | Hehenberger |
| 7,595,566 B2 | 9/2009 | Nitzpon et al. |
| 7,914,411 B2 | 3/2011 | Basteck |
| 7,993,240 B2 | 8/2011 | Weichbold et al. |
| 8,545,360 B2 | 10/2013 | Hicks et al. |
| 2011/0011682 A1 | 1/2011 | Erny et al. |
| 2011/0206517 A1 | 8/2011 | Antonov et al. |

FOREIGN PATENT DOCUMENTS

| | | |
|---|---|---|
| GB | 2136883 | 9/1984 |
| WO | WO1981/001444 | 5/1981 |
| WO | 2004109157 | 12/2004 |
| WO | 2008149109 | 12/2008 |

POWER GENERATING SYSTEM AND HYDRAULIC CONTROL SYSTEM

FIELD OF THE INVENTION

This invention relates to a power generating system of the type in which a fluid driven turbine or rotor drives an alternating current generator. The invention is more specifically concerned with such a system wherein the rotational torque of the turbine or rotor may vary due to changes in the speed of the fluid driving the turbine. An example of such a power generating system is a wind-driven turbine or windmill. The invention also relates to a hydraulic control system for use in a transmission of such a power generating system.

BACKGROUND

Variable rotor speed in wind turbines is desirable for several reasons. For a given rotor, the optimum rotor speed for maximum aerodynamic efficiency is a function of the wind speed. Generally, the optimum rotor speed increases with increasing wind speed. Therefore, variable rotor speed in wind turbines is desirable to maximise energy capture. Variable rotor speed also enables power generation at lower wind speeds (which correspond to lower rotor speeds), increasing the range of wind conditions that a wind turbine can operate in and thereby increasing the annual number of 'run-hours'. Operation at lower speeds also has noise advantages because the rotor sound levels reduce when the turbine runs at lower rpm. Finally, variable rotor speed enables the torque on the transmission to be limited and smoothed at the turbine's rated power, thus reducing, to a greater or lesser extent depending on where in the transmission and how the torque is limited, the torque duty of the gearbox and transmission in general.

Since the 1990s, most commercial wind turbines have adopted some means to enable variable speed of the wind turbine rotor. Such means may be electrical or mechanical 'variable speed' systems. Wind turbines prior to the late 1990s typically used a conventional asynchronous induction generator with a fixed-ratio gearbox which allowed only small rotor speed variations.

Electrical variable speed systems typically enable the generator speed to vary significantly and thereby allow variable rotor speed with a fixed ratio transmission. Power electronic rectifiers and inverters are generally necessary to enable the wind turbine generator (which may be of synchronous or asynchronous design but in either case is not synchronised with the grid in the manner of a conventional synchronous generator) to be electrically connected to an alternating current electrical grid of constant frequency. This is a high cost approach as power electronic rectifiers and inverters at the rating of utility sized commercial wind turbines are expensive.

Wind turbines having electrical variable speed systems also undergo greater drive-train torque fluctuations than those having mechanical systems because the inertia of the generator rotor needs to be accelerated during gusts, giving rise to non-trivial fluctuations in the drive-train torque even though the electrical system may control the magnetic torque at the rotor-stator interface very effectively. Excessive drive-train torque fluctuations can be damaging to the wind turbine transmission and this damage mode is a continuing problem in the wind energy industry.

Mechanical variable speed systems enable the use of a directly grid connected synchronous generator, which runs at constant speed set by and synchronised with the grid. The use of a directly grid connected synchronous generator has cost advantages over electrical variable speed systems because a low cost 'utility grade' synchronous generator can be sourced and there is no need for expensive power electronic rectifiers and inverters. However, a directly grid connected synchronous generator must operate at a constant speed dictated by the electrical grid frequency and the number of poles of the synchronous generator. Therefore, either the wind turbine rotor speed must be constant for a fixed ratio transmission, or a variable ratio transmission must be employed to enable variable rotor speed to maximise the energy capture. Rotors in wind turbines undergo turbulence-induced torque fluctuations. Since grid-connected synchronous generators have no compliance to absorb such torque fluctuations, this means that constant rotor speed is not a practical option for wind turbines and the fluctuations must be smoothed by some other form of compliance (provided by a mechanical variable speed system) to prevent damage to the wind turbine transmission.

Mechanical variable speed systems can manage turbulence-induced torque fluctuations in wind turbines and similar power generation sources such as tidal stream generators.

Most attempts to enable variable rotor speed in wind turbines with constant speed synchronous generators have been variations of the invention described in WO 81/01444. In that document, a variable ratio transmission is achieved using one or more epicyclic gear stages connecting the main mechanical power transmission path between the wind turbine rotor and generator, to a second, parallel bypass power transmission path. The bypass power transmission path may be hydraulic or electrical with two hydraulic or electrical machines, one or both of which may be variable speed, and both of which may be variable power. The two hydraulic or electrical machines are interconnected by a means of transmitting power which may be a closed loop hydraulic or electrical circuit, as appropriate. At low rotor speed bypass power is transmitted from the generator side to the rotor side of the variable ratio transmission to increase the transmission ratio. At high rotor speed bypass power is transmitted from the rotor side to the generator side of the variable ratio transmission to decrease the transmission ratio. This type of variable ratio transmission adds significant complexity and cost to the wind turbine drive-train.

Figure 1:
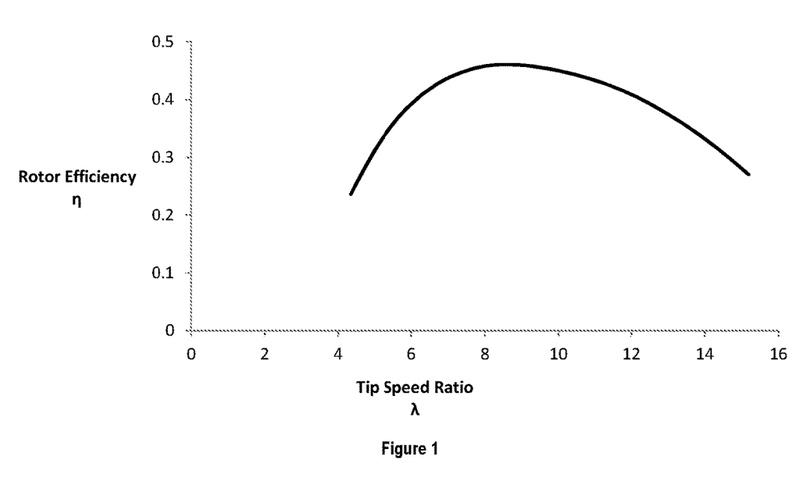
FIG. 1 is a graph of rotor aerodynamic efficiency versus tip speed ratio (TSR) for a known wind turbine rotor.

For a typical commercial wind turbine having a variable ratio transmission as described above, the maximum bypass power required to enable variable rotor speed mode in all wind speeds up to the rated wind speed, may be 20-50% of the rated wind turbine power, depending on the variable speed range and the type of transmission. FIG. 1 shows a graph of rotor efficiency against tip speed ratio (TSR), which is the ratio of the tangential speed of the tip of the rotor blade to the actual velocity of the wind. The peak of this efficiency-TSR curve for a typical rotor is relatively broad and flat, which means the incremental gains in energy capture diminish to the point of being negligible as the TSR is moved closer to the 'optimum TSR', where the 'optimum TSR' is that which gives maximum rotor efficiency (at the maximum in FIG. 1), although the cost of the bypass power system increases the wider the speed and power range over which it is active. Therefore, the benefit to cost also diminishes the wider the speed and power range over which one attempts to maintain the TSR at optimum and a practical limit is determined depending on the cost of the particular bypass power system utilised.

The above type of variable ratio transmission may also limit excessive drive-train torque fluctuations by means of an active controller as described in WO 2004/109157 and WO 2008/149109. These active controllers change the transmission ratio in a complementary way, ideally at the same rate as the transient change in turbine speed, to maintain a constant generator speed and torque while allowing the wind turbine rotor to accelerate and absorb the transient excess kinetic energy. This method of limiting excessive drive-train torque fluctuations may not always be effective due to the response time of the active controller.

U.S. Pat. No. 5,140,170 to Geoffrey M. Henderson describes a wind turbine transmission in which damaging drive-train torque fluctuations are substantially eliminated using a variable ratio transmission with a passive hydraulic torque limiting function, and an active blade pitch control system which allows small variations in wind turbine rotor speed. In the system described in that patent, a grid connected synchronous generator is driven at a constant speed and the wind turbine rotor speed is near constant until the design rated rotor torque level is exceeded due to transient aerodynamic torque fluctuations. When the design rated rotor torque is exceeded, the transmission ratio decreases rapidly due to passive hydraulic slip, the transient excess energy being stored as kinetic energy as the wind turbine rotor accelerates, and also being dissipated as heat by the hydraulic system.

The active blade pitch control in U.S. Pat. No. 5,140,170 prevents rotor over-speed at high wind speeds when the aerodynamic rotor power available is sufficient to operate at or above the design rated rotor torque level. This torque limiting system is simple and cost effective, however the narrow band of variable rotor speed achieved (typically with up to 5% rotor speed variation above the minimum rotor speed) enables the torque limiting system but does not increase energy capture other than by recovering kinetic energy stored in the rotor during transient fluctuations in wind speed at the rated power level. Such a system is generally configured so that the optimum TSR, and hence peak aerodynamic rotor efficiency, is achieved at a certain wind speed. At lower wind speeds the rotor speed is faster than the ideal rotor speed for the optimum TSR and at higher wind speeds the rotor speed is slower than the ideal rotor speed for the optimum TSR. Having a faster than optimum rotor speed at low wind speeds also means that the wind turbine will have a relatively high cut-in wind speed and relatively high turbine sound levels in light winds.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a simple and cost effective control system for a torque limiting variable ratio transmission to provide variable rotor speed at low rotor speeds, to enable a wind turbine with a grid connected synchronous generator to operate with continuously varying rotor speed, and thereby to reduce cut-in wind speed, reduce turbine sound levels in light winds, and increase energy capture across a broader wind speed range compared to a near constant rotor speed wind turbine, and/or to provide the public with a useful alternative to electrical variable speed systems.

SUMMARY OF THE INVENTION

In a first aspect, the invention may be said to broadly consist in a hydraulic control system for controlling a variable ratio transmission of a power generating system comprising a rotor or turbine adapted to be driven by a fluid at variable speed and an electrical generator adapted to be driven at a constant or variable speed, the transmission coupling the rotor or turbine to the electrical generator, the hydraulic control system comprising: a hydraulic motor/pump unit adapted to be operably connected to a superposition gear; said hydraulic motor/pump unit connected to a hydraulic circuit that comprises an orifice and/or a relief valve configured to open at a predetermined hydraulic pressure, the hydraulic circuit configured to switch between a variable low-speed operating mode and a torque limiting high-speed operating mode, wherein in the torque limiting high-speed operating mode the hydraulic motor/pump unit is adapted to be driven by the superposition gear and operates as a pump to drive hydraulic fluid through the orifice and/or relief valve to provide a passive torque limiting function, and wherein in the variable low-speed operating mode the hydraulic motor/pump unit is adapted to be driven as a motor to drive the superposition gear and the hydraulic control system is configured to provide a desired rotor speed by controlling hydraulic fluid flow rate through the hydraulic motor/pump unit.

In an embodiment of the present invention, the hydraulic motor/pump unit is of a positive displacement type. Alternatively, the hydraulic motor/pump unit may be a dynamic type.

In an embodiment of the present invention, the hydraulic circuit is configured to switch between the variable low-speed operating mode and the torque limiting high-speed operating mode in response to measured hydraulic pressure in the hydraulic circuit or otherwise in response to measured torque on the transmission.

In an embodiment of the present invention, the hydraulic fluid flow rate through the hydraulic motor/pump unit is controlled in the variable low-speed operating mode in response to measured hydraulic pressure in the hydraulic circuit or otherwise in response to measured torque on the transmission.

In an embodiment of the present invention, the hydraulic control system further comprises a variable displacement supply pump, wherein in the variable low-speed operating mode the variable displacement supply pump is configured to supply fluid to drive the hydraulic motor/pump unit as a motor. The variable displacement supply pump may be electrically driven. Alternatively, the variable displacement supply pump may be configured to be directly driven by the transmission.

In an embodiment of the present invention, the hydraulic control system further comprises a pressure measuring device arranged to measure the pressure in a high pressure region of the hydraulic circuit. The pressure measuring device may comprise a transducer.

In an embodiment of the present invention, the hydraulic circuit defines a first fluid path and a second fluid path which respectively define fluid flow in the variable low-speed operating mode and the torque limiting high-speed operating mode.

Preferably, the first and second fluid paths are closed loop paths.

In an embodiment of the present invention, the hydraulic control system comprises a controller configured to switch the hydraulic circuit between the first and second fluid paths, at a predetermined hydraulic pressure.

In an embodiment of the present invention, the hydraulic control system further comprises at least one solenoid valve for switching between the first and second fluid paths.

In a second aspect, the invention may be said to broadly consist in a variable ratio transmission for a power generating system, the transmission comprising: a transmission input adapted to be driven at a variable speed; a transmission output adapted to be driven at a constant or variable speed; and a hydraulic control system as outlined in relation to the first aspect above.

In an embodiment of the present invention, the transmission comprises a planetary gear arrangement between transmission input and the transmission output, the planetary gear arrangement comprising a planetary gear input operably connected to the transmission input, a planetary gear output operably connected to the transmission output, and the superposition gear.

In a third aspect, the invention may be said to broadly consist in a power generating system comprising: a rotor or turbine adapted to be driven at a variable speed; a generator adapted to be driven at a constant or variable speed; and a variable ratio transmission as outlined in relation to the second aspect above that couples the rotor or turbine and the generator.

In an embodiment of the present invention, the power generating system has a rated power, and the power output from the power generating system when in the variable low-speed operating mode is limited to be less than or equal to about 25% of the rated power.

In an embodiment of the present invention, the rotor or turbine has a zero slip speed when the angular velocity of the superposition gear is zero, and the minimum rotor speed in the variable low-speed operating mode is greater than or equal to about 75% of the zero slip speed.

In an embodiment of the present invention, the power generating system has a rated power, and the maximum power required by the hydraulic control system components to achieve the variable low-speed operating mode is less than or equal to about 5% of the power generating system rated power.

In an embodiment of the present invention, the generator is a synchronous generator operating at a constant speed set by a larger generating system or grid. Alternatively, the generator may be an asynchronous generator operating at variable speed in combination with an electrical variable speed system.

The following summarises an embodiment of the present invention, which is described in further detail in the 'detailed description' section. The transmission assembly includes a mechanical drive-train connecting the rotor to the generator, and a superposition gear either driving or being driven by a positive displacement hydraulic motor/pump unit (which preferably has a linear relationship between fluid pressure and output torque). A hydraulic circuit is provided which is switchable between two closed loop fluid paths that correspond with two distinct operating modes. The hydraulic circuit and positive displacement motor/pump unit together make up the hydraulic control system.

In the first operating mode (variable low-speed operating mode), the positive displacement hydraulic motor/pump unit operates as a motor and is driven by fluid flow supplied by an electrically driven variable displacement hydraulic pump, which enables the rotor to operate at a variable low speed.

In the second operating mode (torque limiting high-speed operating mode), the positive displacement hydraulic motor/pump unit operates as a pump and drives fluid through an orifice resulting in substantially zero slip in the transmission, until the rotor torque exceeds a predetermined level at which a relief valve opens (passive operation) and allows increased fluid flow-rate through the positive displacement hydraulic motor/pump unit and hence the transmission assembly is allowed to slip so as to permit the rotor speed to increase in such a manner as to maintain a substantially constant torque at the generator.

The variable ratio transmission enables a variable rotor speed that increases rotor power and hence energy capture at low wind speeds, specifically at wind speeds below the point at which the rotor reaches the zero slip rotor speed which is the rotor speed at which the positive displacement hydraulic motor/pump unit is stationary. At wind speeds above this point the variable ratio transmission is primarily intended as a passive torque limiting transmission and at high wind speeds the rotor speed is less than the optimum rotor speed for maximum energy capture.

An active hydraulic control loop is provided to control the transmission in response to the torque derived by measurement of the hydraulic pressure. The control loop is configured to provide an output for switching between the variable low-speed and torque limiting high-speed operating modes, and also to control the hydraulic fluid flow rate when operating in the variable low-speed operating mode which sets the speed of the hydraulic motor/pump unit, and therefore sets the rotor speed when in the variable low-speed operating mode.

The term "comprising" as used in this specification and claims means "consisting at least in part of". When interpreting statements in this specification and claims which include the term "comprising", other features besides the features prefaced by this term in each statement can also be present. Related terms such as "comprise" and "comprised" are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "(s)" following a noun means the plural and/or singular form of that noun.

As used herein the term "and/or" means "and" or "or", or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF A PREFERRED EMBODIMENT

Figure 2:
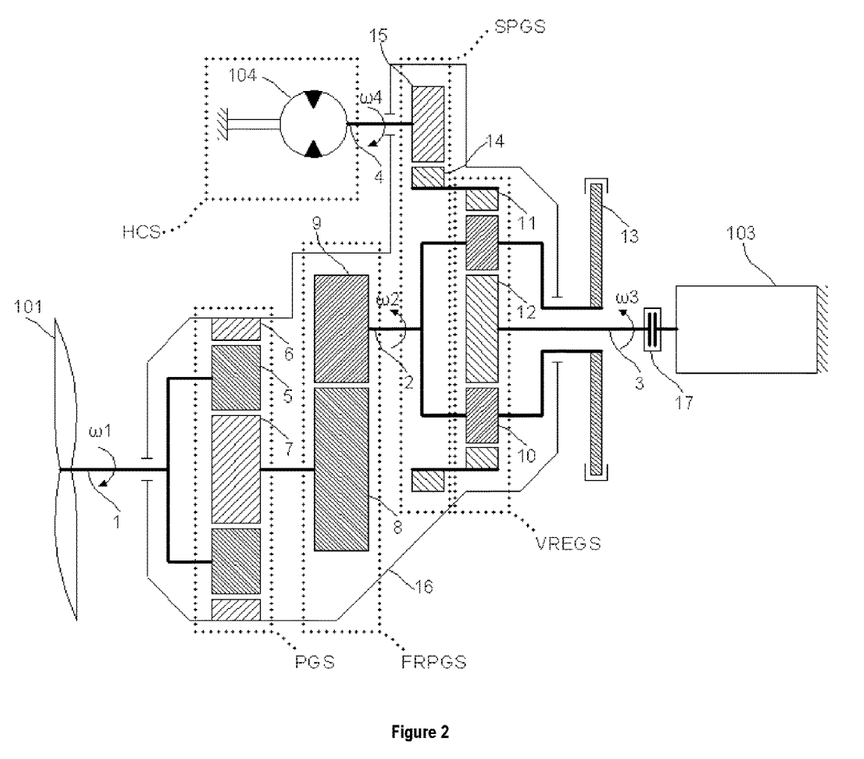
FIG. 2 is a schematic diagram of a power generating system comprising a hydraulic control system HCS and transmission according to one embodiment of the present invention.

Referring to FIG. 2, in a power generating system such as a wind turbine, the shaft 1 of a wind driven rotor 101 provides the input to a planet carrier of a fixed ratio planetary gear stage PGS of a wind turbine transmission, which includes a plurality of planet gears 5, a stationary annulus gear 6 mounted to the transmission housing 16, and a sun gear 7. The sun gear 7 provides an input to a fixed ratio parallel gear stage FRPGS of the wind turbine transmission, which includes a wheel gear 8 and a pinion gear 9 mounted on an output shaft 2. The fixed ratio planetary gear stage PGS and the fixed ratio parallel gear stage FRPGS together form a two-stage fixed ratio transmission for a wind turbine, which may provide a step-up ratio, for example, of 10 or 12 to 1. A brake 13 is operably connected to the output shaft 2 from the parallel gear stage, to provide a means for braking the rotor 101.

The output shaft 2 from the parallel gear stage provides the input to the planet carrier of a variable ratio epicyclic gear stage VREGS of a wind turbine transmission. The variable ratio epicyclic gear stage includes a plurality of planet gears 10, an annulus gear 11, and a sun gear 12. The sun gear 12 drives an output shaft 3 that is operably coupled to a grid connected synchronous generator 103 through a one-way clutch 17. The speed of the generator 103 is maintained constant due to synchronism with the electrical grid to which the generator is coupled.

Alternative gear arrangements are possible which may include a different number of gear stages and the components identified may be connected to different gears in some or all of the gear stages. The input shaft 1 has an angular velocity $\omega_1$, and the output shaft has an angular velocity $\omega_3$. The embodiment of the gear arrangement described is advantageous in providing a high overall variable step-up ratio $\omega_3/\omega_1$, however the present invention does not preclude alternative gear arrangements.

The output shaft 3 is driven at a constant speed, for example 1200, 1500 or 1800 rpm depending upon the electrical grid frequency and the number of poles in the generator 103, except when the one-way clutch 17 over-runs. The one-way clutch may over-run, for example, during transient fluctuations in wind speed, or upon shut-down of the wind turbine if the rotor 101 is braked to a rapid halt by the brake 13 but the generator 103 shaft takes a period of time to come to rest after being electrically disconnected from the grid, when generator deceleration is effected only by frictional and windage losses in the generator itself.

The annulus gear 11 of the epicyclic gear stage VREGS is operably connected to a wheel gear 14 which may drive or be driven by a pinion gear 15 mounted on a shaft 4. The pinion shaft 4 may drive or be driven at a variable speed by a reversible hydraulic unit 104 that is operable as either a hydraulic pump or motor. The hydraulic unit 104 forms part of the hydraulic control system HCS of an embodiment of the present invention.

The overall step-up ratio from the input shaft 1 of angular velocity $\omega_1$, to the main output shaft 3 of angular velocity $\omega_3$, is infinitely variable within a design range. The variable transmission ratio is achieved by the annulus gear 11 of the epicyclic gear stage VREGS acting as a speed superposition gear either driving or being driven at variable speed by the hydraulic motor/pump unit 104. A superposition gear in this context is one member of the epicyclic gear stage VREGS that comprises three rotating members, and wherein one member is operably connected to the main output shaft 3 of known angular velocity $\omega_3$ and another member is operably connected to the input shaft 2 of variable angular velocity $\omega_2$ such that the angular velocity of the superposition gear or that of the input shaft 2 are calculable by superposition provided that the angular velocity of either is known. In alternative embodiments the input shaft, output shaft and superposition gear can be operably connected to different members of the epicyclic gear stage VREGS. A second parallel gear stage SPGS between the annulus 11 and the pinion shaft 4 comprising a wheel gear 14 and the pinion gear 15 enables the ratio of this gear stage to be tuned such that an optimum speed and torque output can be obtained using a readily available hydraulic motor/pump unit. The design range of the overall variable step-up ratio $\omega_3$ to $\omega_1$ may be for example between 30 to 1 and 40 to 1.

The preferred embodiment transmission described above has three slip states: a negative slip state, a zero slip state, and a positive slip state. At zero slip, the rotational velocity of the hydraulic motor/pump unit 104 is zero and the rotor has a zero slip rotor speed $\omega_{1zero}$. The transmission has a zero slip rotor speed $\omega_{1zero}$ so long as sufficient aerodynamic rotor power is available to maintain the main output shaft 3 at the constant speed of the grid connected synchronous generator 103 and the one-way clutch 17 is therefore not over-running. Negative slip occurs when the actual rotor speed $\omega_1$ is slower than the zero slip rotor speed $\omega_{1zero}$, and positive slip occurs when the actual rotor speed $\omega_1$ is faster than the zero slip rotor speed. When operating with negative slip, the hydraulic motor/pump unit 104 operates as a motor to make up the speed deficit and provide reaction torque to enable power transfer from the input shaft 1 to the main output shaft 3. When operating with positive slip, the hydraulic motor/pump unit 104 operates as a pump to accommodate a lower $\omega_3/\omega_1$ ratio and provide reaction torque to enable power transfer from the input shaft 1 to the main output shaft 3.

Figure 3:
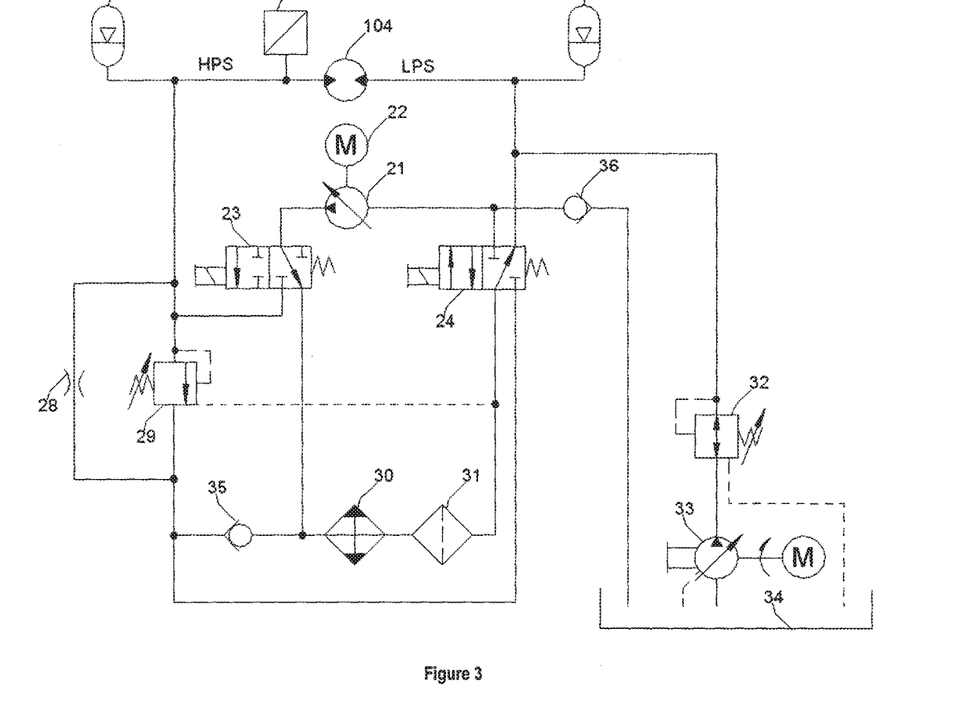
FIG. 3 is a schematic diagram of the hydraulic circuit for the hydraulic control system for a transmission according to one embodiment of the present invention.

FIG. 3 shows a first preferred embodiment of a hydraulic circuit for the hydraulic motor/pump unit 104, and that forms part of the hydraulic control system HCS. The hydraulic circuit has a high pressure side HPS and a low pressure side LPS. As discussed above, the transmission has two operating modes, a first mode in which the hydraulic motor/pump unit 104 operates as a pump, and a second mode in which the unit 104 operates as a motor. When the hydraulic motor/pump unit 104 operates as a pump, solenoid valves 23, 24 are in the de-energised positions shown in FIG. 3. A hydraulic charge pump 33 and reservoir 34 provide hydraulic fluid and system pressure. A pressure reducing/relieving valve 32 ensures fluid is provided at a constant charge pressure to the low pressure side of the hydraulic motor/pump unit 104. A low pressure accumulator 27 is provided to damp dynamic effects on the low pressure side of the hydraulic circuit.

When the hydraulic motor/pump unit 104 is operating as a pump, the transmission provides the input power to pump fluid from the low pressure side to the high pressure side of the hydraulic motor/pump unit 104. The high pressure fluid is then relieved through a fixed orifice 28 and also through a relief valve 29 above a set pressure before being returned to the low pressure side of the hydraulic motor/pump unit 104 through a check valve 35, oil cooler 30, filter 31 and solenoid valve 24. The relief valve 29 is set to open at a predetermined differential pressure that corresponds with an upper limit torque on the hydraulic motor/pump unit 104 which, in turn, corresponds to an upper limit torque on the main output shaft 3. Preferably the upper limit torque on the output shaft 3 is the torque at the rated power of the wind turbine.

When the relief valve 29 is closed, the transmission is substantially rigid other than some small compliance provided by fluid flow through the orifice 28 and the high pressure accumulator 26. Flow through the orifice 28 allows a small positive slip, and the high pressure accumulator 26 damps dynamic effects on the high pressure side of the hydraulic circuit. The relief valve 29 opens in response to increased pressure as the fluid flow rate through the orifice 28 increases due to increased speed of the motor/pump unit 104, increasing positive slip, and thereby allowing the speed of the rotor 101 to increase while the speed of the generator 103 remains constant.

When the motor/pump unit 104 is acting as a pump, a variable displacement supply pump 21 driven by an electric motor 22 provides cooling for the hydraulic fluid in the reservoir 34—which may be heated in the course of performing other wind turbine hydraulic functions such as blade pitch and nacelle yaw functions. When the variable displacement supply pump 21 is activated, additional fluid from the reservoir 34 is drawn into the hydraulic circuit through a check valve 36, the supply pump 21 and solenoid valve 23. This fluid is circulated through the oil cooler 30, filter 31 and second solenoid valve 24. Any additional fluid is then relieved from the hydraulic circuit through the pressure reducing/relieving valve 32 and returned to the system reservoir 34, such that the pressure on the low pressure side of the hydraulic circuit is maintained at the charge pressure set by the pressure reducing/relieving valve 32.

When the hydraulic motor/pump unit 104 operates as a motor, the solenoid valves 23 and 24 are in their energised positions, contrary to the positions drawn in FIG. 3. The supply pump 21 is driven by the electric motor 22 to pump fluid from the low pressure side to the high pressure side of the supply pump 21. The fluid flow path from the high pressure side of the supply pump 21 is through valve 23, hydraulic motor/pump unit 104, valve 24, check valve 35, oil cooler 30, filter 31 and valve 24 to provide a closed loop circuit. The pressure reducing/relieving valve 32 provides the same function in this operating mode to maintain the set charge pressure on the low pressure side of the circuit. There is a small leakage flow from the high pressure side to the low pressure side of the circuit through the orifice 28, which does not contribute to useful work as it bypasses the hydraulic motor/pump unit 104. This leakage flow is small and the consequent power loss is negligible, as the differential pressure is low when operating the transmission in this mode.

A pressure transducer 25 is positioned to provide a measure of the hydraulic fluid pressure on the high pressure side of the hydraulic circuit. The differential pressure across the hydraulic motor/pump unit 104 can be derived from the pressure at the transducer 25 at all times, because the low pressure side of the circuit is maintained at the set charge pressure by the pressure reducing/relieving valve 32. This differential pressure across the hydraulic motor/pump unit 104 is used as the measured control input parameter to set the position of the solenoid valves 23 and 24 and therefore to select the operating mode of the transmission.

When the hydraulic motor/pump unit 104 operates as a motor, the transmission is operating with negative slip which is herein referred to as the variable low-speed operating mode. When the hydraulic motor/pump unit 104 operates as a pump, the transmission is operating with positive slip which is herein referred to as the torque limiting high-speed operating mode.

It will be appreciated that power input is required from the variable displacement supply pump 21 in the form of electrical power drawn by the motor 22 when operating in the variable low-speed operating mode, and that this power input (neglecting losses) is recovered by the generator 103. It will also be appreciated that there is a waste of power dissipated as heat when operating in the torque limiting high-speed operating mode. Neglecting inefficiencies in the generator and mechanical and hydraulic systems of the transmission, the equations governing the wind turbine power relationships can be set out as follows:

$$\text{Rotor power: } P_{101} = T_1 \cdot \omega_1 \qquad (1)$$

$$\text{Hydraulic motor/pump unit power: } P_{104} = T_1 \cdot (\omega_1 - \omega_{1zero}) = T_4 \cdot \omega_4 \qquad (2)$$

$$\text{Generator power: } P_{103} = P_{101} - P_3 = T_3 \cdot \omega_3 \qquad (3)$$

Where $T_1$ is the torque at component 1, $T_3$ is the torque at component 3, and $T_4$ is the torque at component 4, $\omega_3$ is the angular velocity of component 3, and $\omega_4$ is the angular velocity of component 4. The operating characteristics of the preferred embodiment transmission will now be described with reference to the figures. The transmission has four operating regions through the operating wind speed range. These regions are indicated by letters A to E in the figures.

Figure 4:
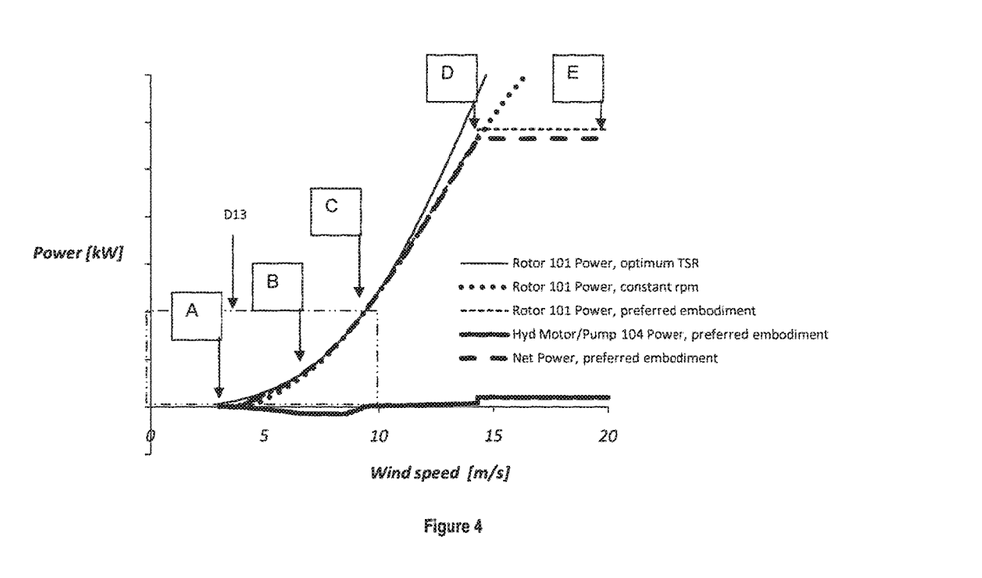
FIG. 4 is a graph of rotor and hydraulic unit power versus wind speed for one embodiment of the present invention.

FIG. 4 shows a typical rotor power verses wind speed curve for an example wind turbine rotor with variable speed to maintain the most efficient TSR (solid thin line). A rotor power versus wind speed curve for the same wind turbine rotor with a constant rotor speed is also shown (broken dot line). In this example, the constant rotor speed shown is optimised for approximately 9 ms$^{-1}$ wind speed, and this constant rotor speed is taken as the zero slip rotor speed $\omega_{1zero}$ for demonstration of operating characteristics of the transmission according to the present invention. Alternatively, the zero slip rotor speed may be optimised for a different wind speed and a different rotor design, depending upon the particular wind turbine application.

In the first operating region A-B, the wind turbine rotor 101 of the preferred embodiment is controlled to run at its minimum operating speed, which may be determined considering machine inefficiencies, rotor dynamic stability and the hydraulic motor/pump unit 104 speed limit. In the second operating region B-C, the wind turbine rotor 101 of the preferred embodiment is controlled to run at continuously variable speed such that the rotor speed is dependent on wind speed and is optimised for maximum energy capture, subject to the maximum power rating of the variable displacement supply pump 21 and its motor 22. In regions A-B-C the hydraulic motor/pump unit 104 is operating as a motor (variable low-speed operating mode). Point C is the zero slip operating condition which may or may not be on the power curve for optimum TSR.

At higher wind speeds through the third and fourth regions C-D-E, the hydraulic motor/pump unit 104 is operating as a pump (torque limiting high-speed operating mode). In regions C-D-E, the wind turbine rotor 101 is passively controlled with narrow band speed control. Transient rotor over-speed TOS above the wind turbine rotor 101 rated speed set point in the region D-E may occur due to wind turbulence; however, the magnitude of such over-speed events is maintained within acceptable limits by the rotor pitch control system.

As wind speed increases and point D is reached, the relief valve 29 will open and high pressure fluid will be relieved through the fixed orifice 28 and also through the relief valve 29.

Figure 13:
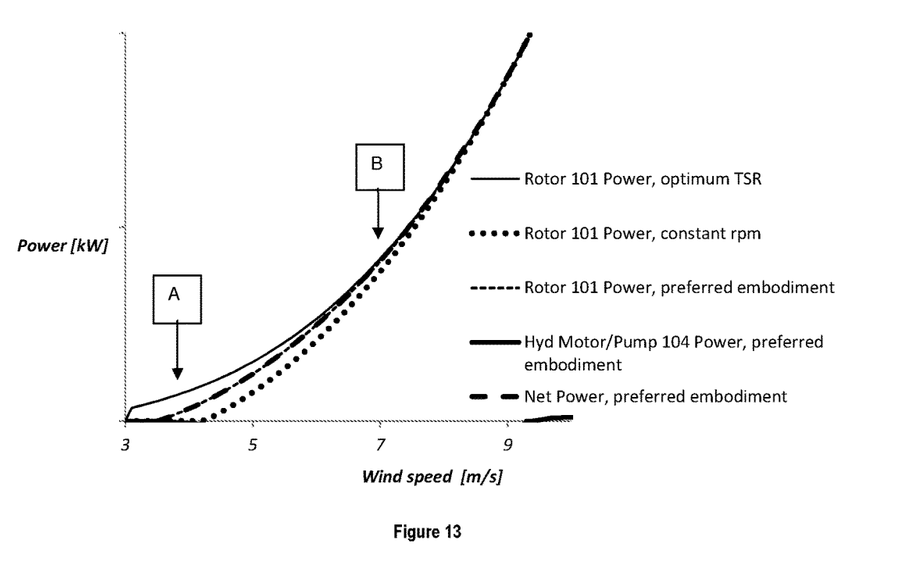
FIG. 13 is a graph showing detail D13 of a part of the graph shown in FIG. 4, provided for clarity.

The hydraulic motor/pump unit 104 must extract or supply power from and to the transmission. The power extracted (or supplied) is a function of the rotor torque and speed as described by Equation (2). The net power shown in FIG. 4 (large dashed line) is the useful rotor power which is calculated from the generator 103 power, less the hydraulic motor/pump unit 104 input power in variable low-speed operating mode, neglecting inefficiencies. This shows the improved energy capture at wind speeds below point C, and a lower cut-in wind speed, relative to the same wind turbine rotor at constant speed. FIG. 13 shows an enlargement of detail D13 of FIG. 4.

The hydraulic motor/pump unit 104 is preferably a constant displacement type and therefore exhibits a constant torque per unit differential pressure. The variable ratio epicyclic gear stage VREGS dictates that the speed of the hydraulic motor/pump unit 104 is proportional to rotor slip speed ($\omega_1-\omega_{1zero}$). Therefore, speed, torque and hydraulic pressure/flow characteristics relating the rotor 101 and the hydraulic motor/pump unit 104 can be derived:

Dimensionless rotor slip speed: % slip=($\omega_1-\omega_{1zero}$)·100/$\omega_{1zero}$ (4)

Hydraulic motor/pump unit speed: $\omega_4 = K \cdot \%$ slip (5)

Hydraulic motor/pump unit differential pressure:
$p_{104} = T_4/C$ (6)

Hydraulic motor/pump unit volumetric flow rate:
$q_{104} = W \cdot \omega_4$ (7)

Where the above constants are defined:
K=Hydraulic motor/pump unit 104 angular velocity per percent rotor slip
C=Hydraulic motor/pump unit 104 torque per unit differential pressure
W=Hydraulic motor/pump unit 104 volumetric displacement per unit angular displacement The desired value for constant K can be achieved through the gear design of the transmission using known gear ratio relationships. The constants C and W are properties of the selected hydraulic motor/pump unit 104. For a particular wind turbine application, the constant K and a particular hydraulic motor/pump unit are selected depending on the speed and power requirements for the motor/pump unit, limitations relating to maximum hydraulic system pressure, the range of variable rotor speed and the ratio required of the transmission, and the selection of a zero slip rotor speed.

Figure 5:
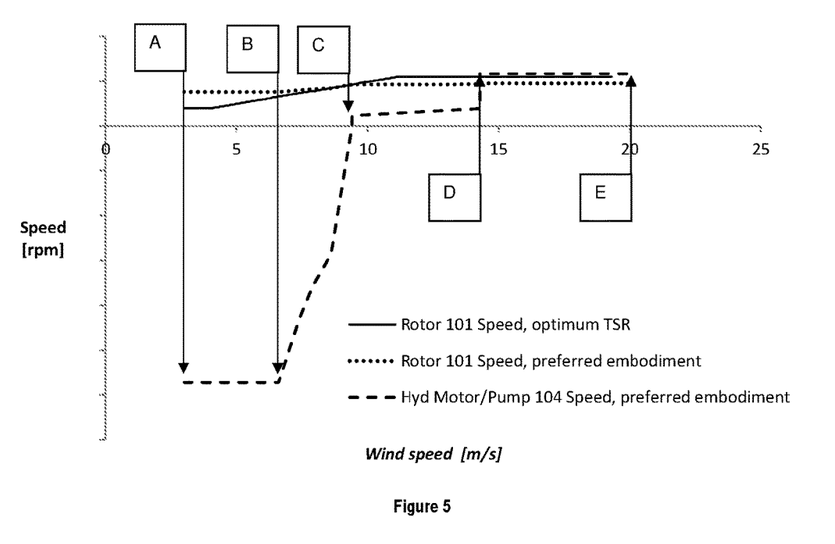
FIG. 5 is a graph of rotor and hydraulic unit speeds versus wind speed for one embodiment of the present invention.
Figure 6:
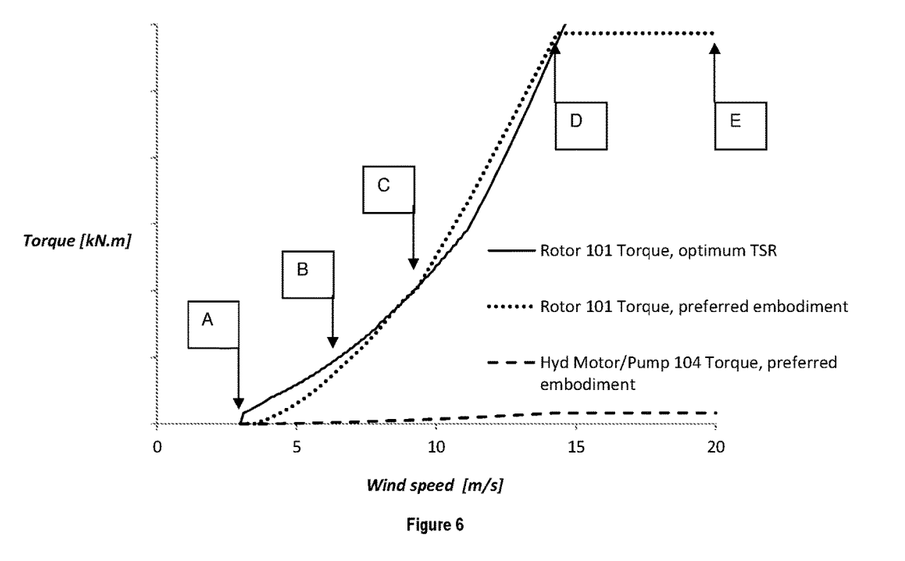
FIG. 6 is a graph of rotor and hydraulic unit torques versus wind speed for one embodiment of the present invention.
Figure 7:
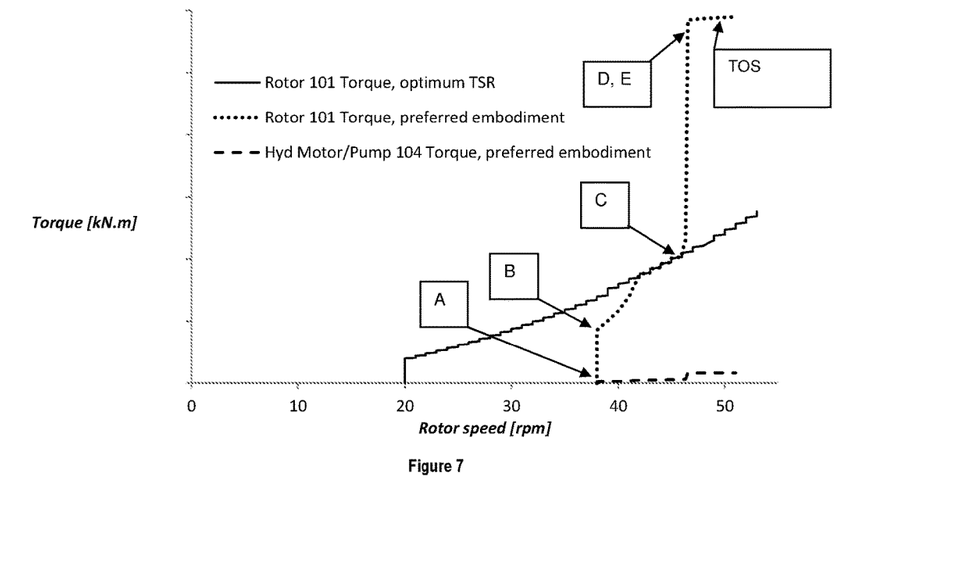
FIG. 7 is a graph of rotor and hydraulic unit torques versus rotor speed for one embodiment of the present invention.

FIGS. 5, 6 and 7 show speed and torque relationships according to Equations (1) to (7), for a preferred embodiment transmission. In the variable low speed operating mode in regions A to C, the maximum power supplied to the hydraulic motor/pump unit is assumed to be limited to 3% of the rated wind turbine electrical power output. This indicates a practical limitation on the power that can be supplied by the supply pump 21 and its motor 22 given the cost of the pump 21 and motor 22 relative to the aforementioned increasingly incremental improvement in energy capture due to improved rotor efficiency as the optimum TSR is approached (see FIG. 1). In the example shown, this power limitation has the effect of requiring a slightly faster rotor 101 speed than for the optimum TSR speed for a part of the region B-C.

The present invention can achieve a more cost-effective solution by applying this power limitation to save more value in capital cost and hydraulic system losses than is sacrificed by having incrementally sub-optimal rotor energy capture.

Figure 8:
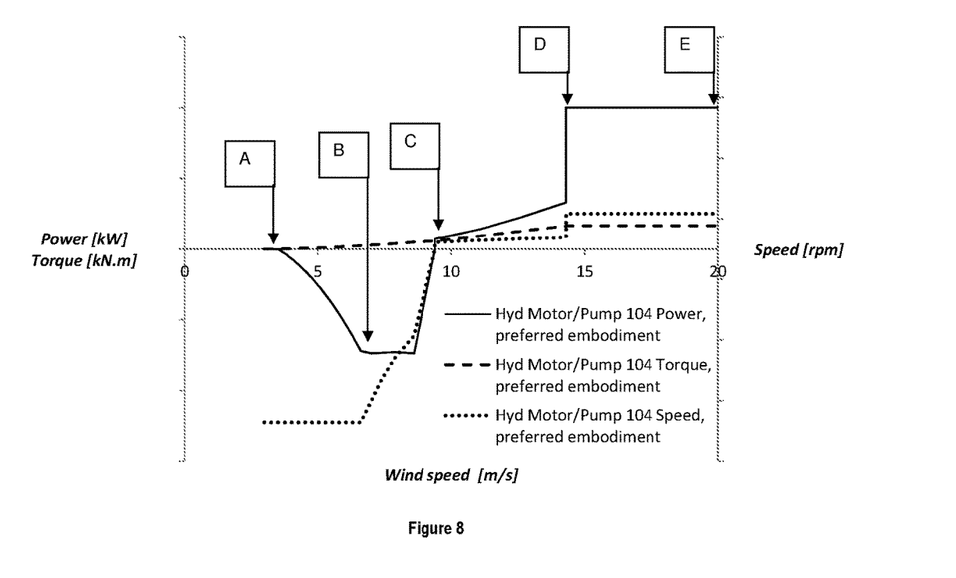
FIG. 8 is a graph of hydraulic unit power, torque and speed versus wind speed for one embodiment of the present invention.
Figure 9:
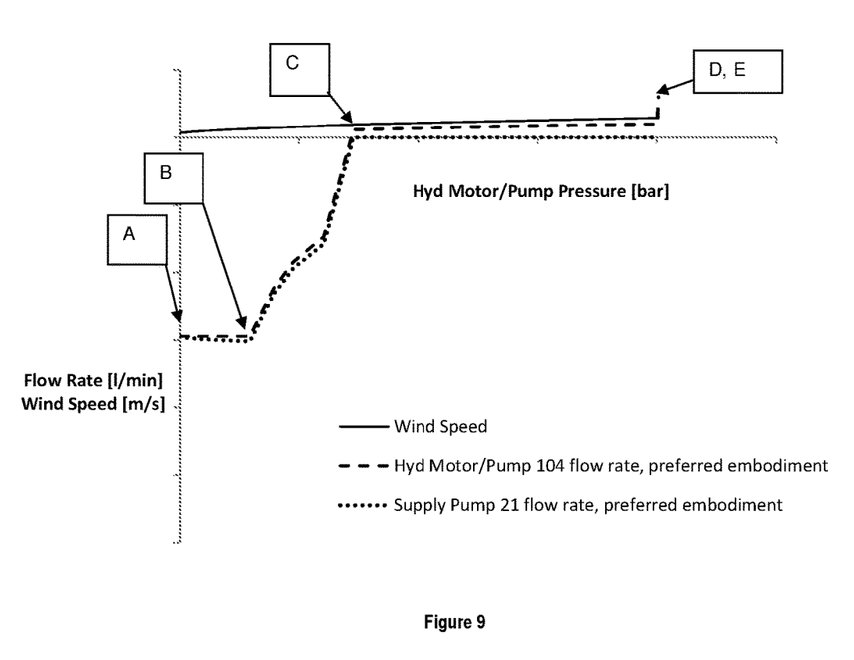
FIG. 9 is a graph of hydraulic unit flow rate and wind speed versus hydraulic unit differential pressure for one embodiment of the present invention.

Referring to FIGS. 8 and 9, the transmission control parameter will now be described. In the variable low-speed operating mode (regions A-B-C), the wind turbine rotor 101 speed is controlled by controlling the fluid flow rate supplied by the variable displacement supply pump 21 to the hydraulic motor/pump unit 104. In this operating mode, the wind turbine control system uses the measured hydraulic motor/pump unit 104 differential pressure as a direct measure of the unit 104 reaction torque, and this reaction torque or pressure value is then used to set the hydraulic motor/pump unit 104 speed for the desired rotor 101 speed. In the torque limiting high-speed operating mode (regions C-D-E), the wind turbine is passively controlled by the hydraulic circuit. The transmission control parameter is therefore hydraulic motor/pump unit 104 torque (or pressure).

FIG. 9 shows the hydraulic fluid flow control relationship which may for instance be implemented by the wind turbine controller by means of a look-up table or function to set the supply pump flow rate as a function of hydraulic motor/pump unit differential pressure which is measured by the high pressure transducer 25. The small difference in flow rates between the hydraulic motor/pump unit 104 and supply pump 21 is due to leakage flow through the orifice 28 when operating in variable low-speed operating mode.

The wind turbine control system also employs blade pitch control with a rotor speed set point corresponding to the desired rotor speed at rated power (point D). The blades will therefore normally be pitched fully to fine through regions A-B-C and most of region C-D. Blade pitch activity normally only occurs at and above rated power where the blades feather to limit the maximum rotor speed.

This control system, utilising pressure from the transducer 25, eliminates the need to measure wind speed or shaft speeds for the purposes of controlling the variable ratio transmission in the variable low-speed operating mode. Wind speed fluctuations and hence rotor power and torque fluctuations that occur at a faster rate than that at which the hydraulic fluid flow control is set to respond are benign, as these will only cause the rotor to momentarily operate at a torque and speed combination that departs slightly from the design characteristic. In practice, the response speed of the hydraulic fluid flow control system is set considering the rate of wind speed fluctuations, the achievable rate of rotor acceleration and deceleration, and practical limitations on the rate at which hydraulic fluid flow can be changed through the variable displacement hydraulic supply pump 21.

Figure 10:
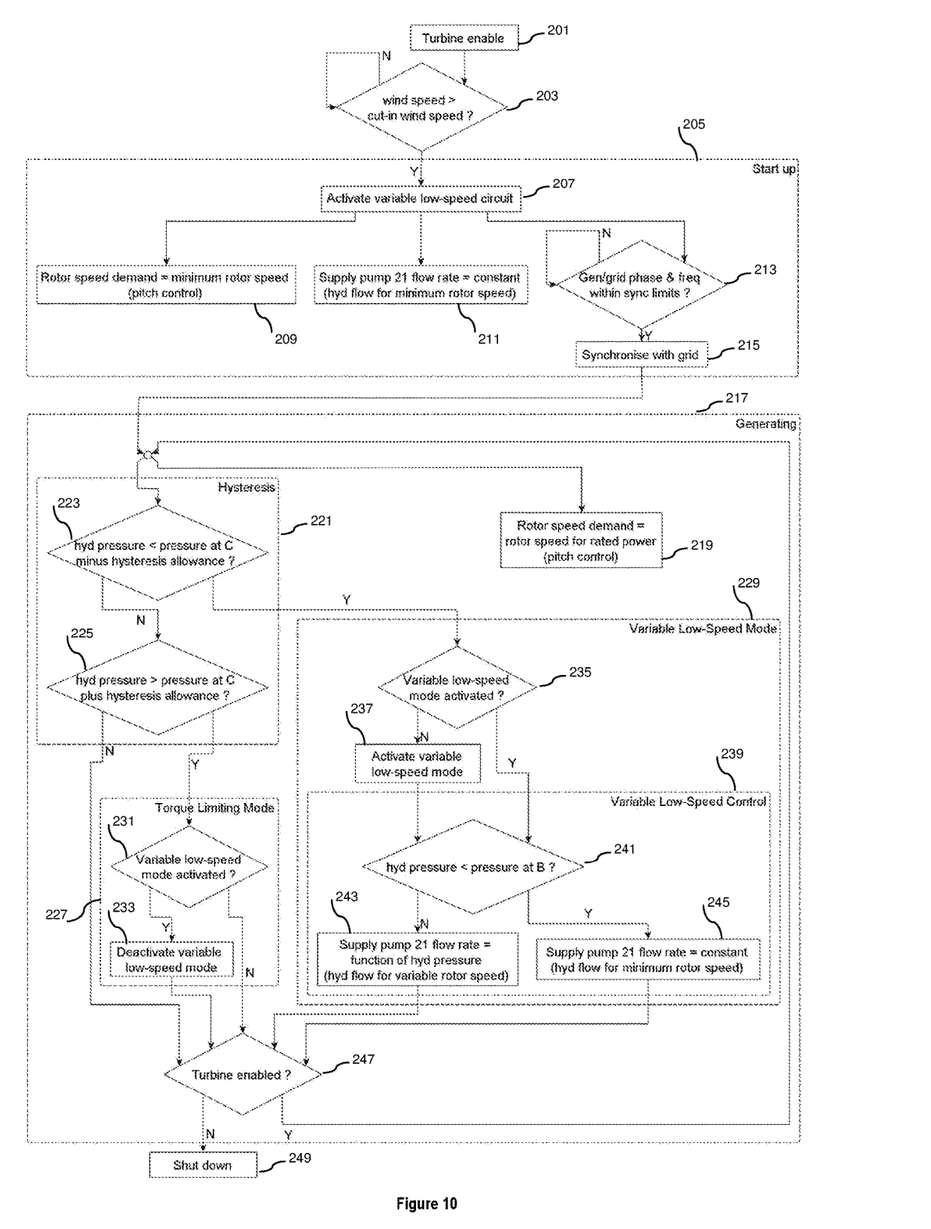
FIG. 10 is a simplified control logic diagram for a hydraulic control system for a transmission according to one embodiment of the present invention.

Simplified control logic is shown in FIG. 10 for the transmission controlled by the hydraulic circuit of FIG. 3. Letters 'B' and 'C' referred to in the flow chart of FIG. 10 refer to points B and C in FIG. 9. The control logic will be embodied in any suitable type of controller, such as a programmable logic controller or a programmable microprocessor for example. The two operating modes (variable low-speed and torque limiting high-speed) are switched between using the solenoid valves 23 and 24. When the variable low-speed operating mode is activated, the rotor speed and hence power is controlled by setting the variable displacement supply pump 21 flow rate in response to the hydraulic motor/pump unit 104 differential pressure derived from the measured hydraulic pressure at the high pressure transducer 25.

Referring to FIG. 10, the control logic shall now be described. When the wind turbine run flag 201 is enabled, wind speed is measured and if the measured wind speed 203 is greater than the programmed cut-in wind speed, the start-up routine 205 is entered. In the start-up routine the variable low-speed operating mode 207 is activated, the rotor speed demand input for the wind turbine pitch control algorithm is set to the minimum operating rotor speed 209, the supply pump 21 flow rate is set to its maximum hydraulic flow rate 211 corresponding to the minimum operating rotor speed, and when the rotor speed is sufficiently stabilised and controlled such that the measured error values between the generator and utility grid electrical phase angle and frequency are within programmed limits 213, the generator to grid contactor is closed to synchronise 215 the generator with the grid.

The generating mode 217 is entered upon completion of the start-up routine 205. In the generating mode, the rotor speed demand for the wind turbine pitch control algorithm is set to the rated (maximum nominal) rotor speed 219. Either the torque limiting high-speed operating mode 227 or the variable low-speed operating mode 229 is selected according to the measured hydraulic pressure compared with the programmed pressure set point C. The hysteresis loop 221 is provided in order to prevent excessive switching between the torque limiting high-speed operating mode and the variable low-speed operating mode when the measured hydraulic pressure is fluctuating about the pressure set point C. Within the hysteresis loop 221, if the measured hydraulic pressure is less than the pressure set point C minus the hysteresis allowance 223 then the variable low-speed operating mode 229 is entered, and if the measured hydraulic pressure is greater than the pressure set point C plus the hysteresis allowance 225, then the torque limiting high-speed operating mode 227 is entered. The order of conditions 223 and 225 means that if the measured hydraulic pressure is within the hysteresis band about the pressure set point C, then provided that the turbine run flag 247 remains enabled, the operating mode (torque limiting high-speed or variable low-speed) will remain unchanged and the hysteresis condition 221 will be re-tested at the programmed cycle frequency.

Within the torque limiting high-speed operating mode 227, if the variable low-speed operating mode was active 231 on the previous programme cycle then the variable low-speed operating mode is de-activated 233 by switching solenoid valves 23 and 24, and if the variable low-speed operating mode was not active on the previous programme cycle 231 then this remains true. Within the variable low-speed operating mode 229, if the variable low-speed operating mode was active on the previous programme cycle 235 then the variable low-speed control mode 239 is entered directly, otherwise the variable low-speed operating mode is activated 237 by switching solenoid valves 23 and 24 and the variable low-speed control mode 239 is then entered. Within the variable low-speed control mode 239, if the measured hydraulic pressure is less than the programmed pressure set point B (condition 241) then the supply pump 21 hydraulic flow rate is set to its maximum flow rate 245 corresponding to the minimum operating rotor speed. Otherwise the supply pump 21 hydraulic flow rate is varied 243 as a function of the measured hydraulic pressure, for variable rotor speed.

The generating mode 217 control logic process described in steps 219 through 247 of FIG. 10 will normally be repeated at the programmed cycle frequency, provided that the wind turbine run flag 247 remains enabled, and other conditions not described in FIG. 10 continue to be met, such as the measured wind speed remaining above the cut-in wind speed and provided that no fault or alarm conditions are active. If the turbine run flag 247 is disabled then the wind turbine is shut down by the shut down routine 249.

Figure 11:
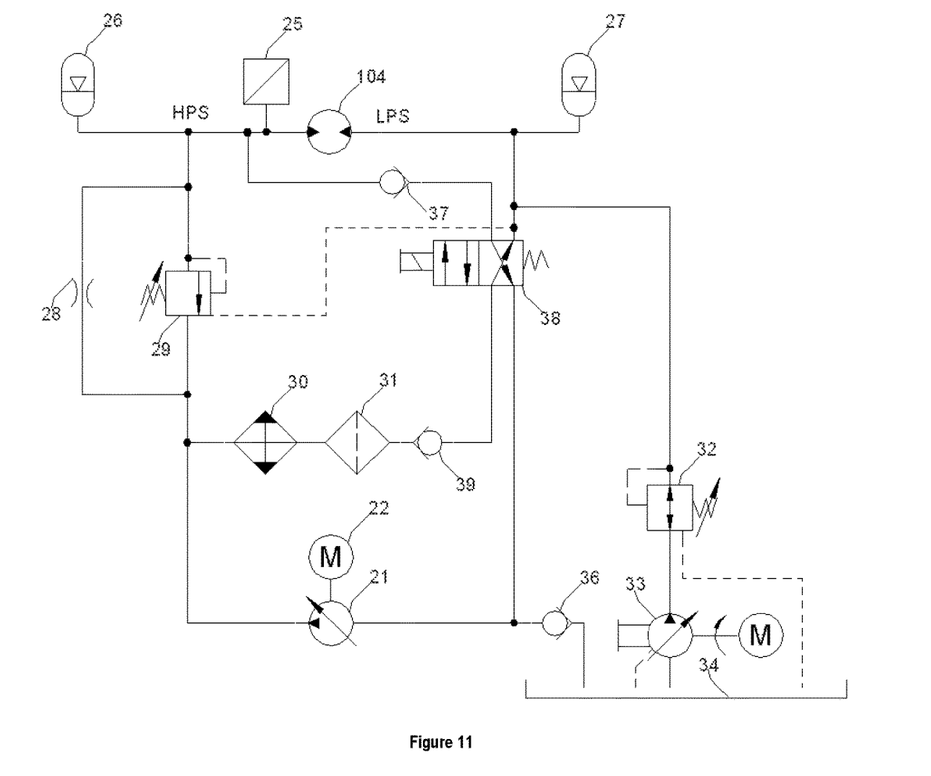
FIG. 11 is a schematic diagram of the hydraulic control system for a transmission according to a second embodiment of the present invention.
Figure 12:
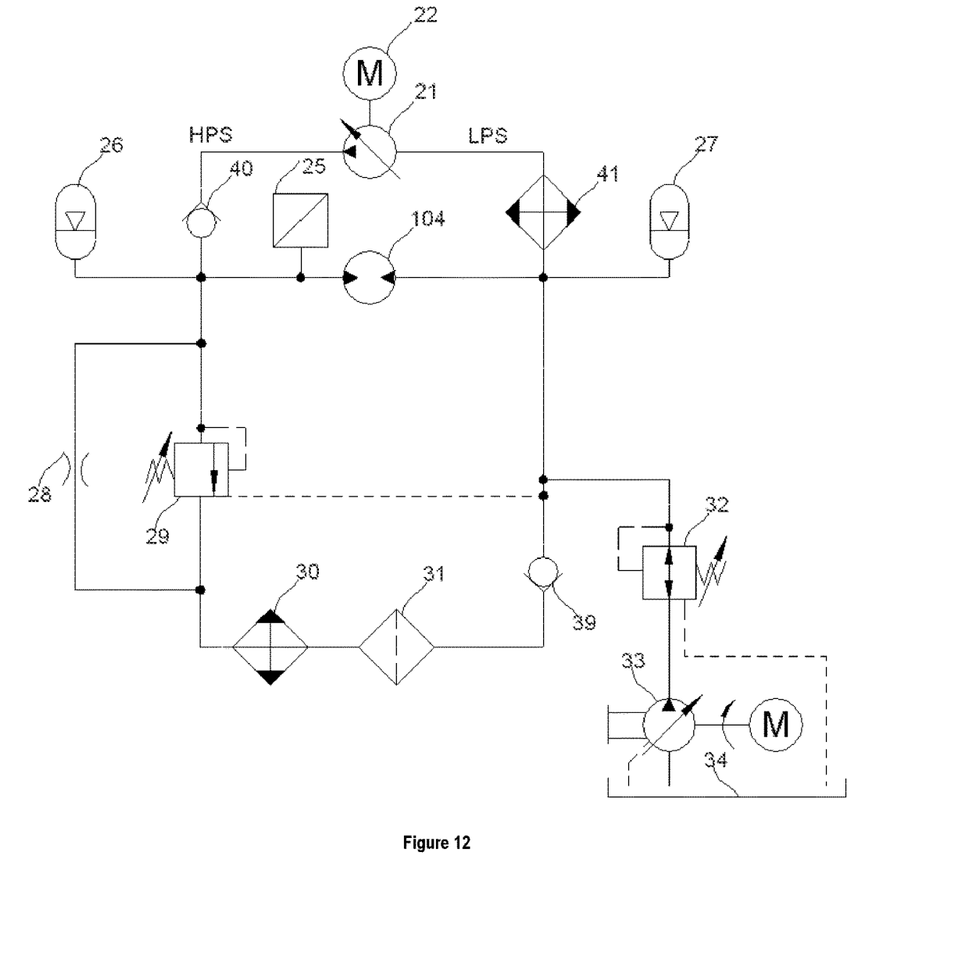
FIG. 12 is a schematic diagram of the hydraulic control system for a transmission according to a third embodiment of the present invention.

FIG. 3 illustrates the hydraulic circuit for one preferred embodiment of the hydraulic control system for a transmission according to the present invention. FIGS. 11 and 12 show hydraulic circuits for alternative embodiments, and like numerals indicate like parts. Unless described below, the operation of the circuits is as described above, and control of those embodiments will be as per FIG. 10.

In the embodiment shown in FIG. 11, the reconfigured hydraulic circuit allows the two solenoid valves 23 and 24 of the first embodiment to be replaced by a single solenoid valve 38 and additional check valves 37 and 39 to prevent reverse flows. FIG. 11 shows solenoid valve 38 in the de-energised position, which corresponds to the torque limiting high-speed operating mode. In this operating mode, the operation of the hydraulic circuit is as described for FIG. 3. When the variable low-speed operating mode is selected by switching the solenoid valve 38 to the position contrary to that shown in FIG. 11, the circuit varies from the operation of that in FIG. 3 in that the oil cooler 30 and filter 31 are located on the inlet side of the hydraulic motor/pump unit 104 which is the high pressure side of the hydraulic circuit.

Practical pressure limitations on hydraulic cooler and filter components mean that the transmission with a hydraulic circuit configured as shown in FIG. 11 may have a maximum pressure limitation when operating in the variable low-speed operating mode. Such a pressure limitation would be that the transmission should be switched from variable low-speed operating mode to torque limiting high-speed operating mode at a lower pressure, and therefore a lower rotor torque and lower wind speed than may otherwise be selected as the switch over point. The effect on the variable low-speed operating characteristics is easily calculable using the Equations 1 to 7, and it can be seen that point C on FIG. 4 will be at a lower wind speed and on a power curve corresponding to the zero slip rotor speed but not necessarily on the power curve for optimum TSR.

Another alternative embodiment of the hydraulic circuit is shown in FIG. 12. In that embodiment, the two solenoid valves 23 and 24 of the first embodiment shown in FIG. 3 have been eliminated, and no solenoid valve switching is required to change between variable low-speed and torque limiting high-speed operating modes. In this alternative embodiment, the variable displacement hydraulic supply pump 21 is controlled in the same way as described for the previous embodiments, and check valves 39 and 40 prevent reverse flow so that the transmission will operate in variable low-speed operating mode when the flow delivered by the supply pump 21 is non-zero. The torque limiting high-speed operating mode is passively selected when the supply pump 21 flow rate is set to zero.

In the embodiment of FIG. 12, the supply pump 21 cannot perform the hydraulic cooling pump function in the torque limiting high-speed operating mode as for the embodiment of FIG. 3. Therefore, an additional pump may be supplied to provide this function. An additional oil cooler 41 is necessary in this embodiment because there is no other hydraulic cooling provided in the closed loop (the upper loop of FIG. 12) that forms the main hydraulic fluid flow path when operating in variable low-speed operating mode. Heat generation in this part of the hydraulic circuit is only due to losses in the hydraulic motor/pump unit 104 and the variable displacement hydraulic supply pump 21, therefore the oil cooler 41 may be smaller than the oil cooler 30 for the torque limiting circuit (the lower loop of FIG. 12).

Preferred embodiments of the invention offer a variable low-speed operating mode that can be configured to offer the most desirable features of a variable speed transmission for a wind turbine or similar application: increased energy capture in light winds due to lower rotor speed and a lower cut-in wind speed, and correspondingly reduced noise levels in light winds. Preferred embodiments of the invention can be configured for a particular application such that the net benefit in terms of lifetime energy capture per unit cost is maximised by selecting a suitable zero slip rotor speed and power and rotor speed limits in the variable low-speed operating mode. Typically the variable low-speed operating mode may be active up to about 25% of the rated power and the minimum rotor speed in the variable low-speed operating mode may be about 75% of the zero slip rotor speed. The maximum hydraulic power supplied by the hydraulic motor/pump unit when in the variable low-speed operating mode may typically be limited to about 5% of the rated power, allowing the rotor TSR to depart slightly from the optimum TSR when this limit is enforced. The selection of these parameters can be made considering the quantifiable lifetime energy capture per unit cost given any particular known wind speed distribution.

Preferred embodiments of the invention have been described by way of example only and modifications may be made thereto without departing from the scope of the invention.

For example, the variable displacement hydraulic supply pump 21 in FIG. 3, 11 or 12 may be directly driven mechanically (for example by a driveshaft or belt drive) from the transmission assembly instead of by the electric motor 22. This may be preferable for a particular application if the additional drive-train complexity required to drive the pump 21 can be incorporated at a lower cost than the electric motor and pump configuration shown.

While the hydraulic control system HCS has been described as forming an integral part of a wind turbine, the hydraulic control system could instead be retrofitted to the transmission of an existing wind turbine to improve its performance.

As another example, while the hydraulic motor/pump unit is described as being of a positive displacement type, it could instead be a dynamic type.

As another example, while switching between operating modes and controlling the hydraulic fluid flow rate through the hydraulic motor/pump unit in the variable low-speed operating mode is described as occurring in response to measured hydraulic pressure, either could be done based on a different measured parameter such as measured rotor speed or wind speed for example. However, automatic mode switching and variable low-speed control based on measured hydraulic pressure is preferred, because hydraulic pressure is in effect a direct measure of torque which responds faster than rotor speed to changes in aerodynamic rotor power. Additionally, wind speed measurements are usually provided by an anemometer at one location, typically on the wind turbine nacelle, which provides a measure of wind speed not always exactly representative of the equivalent wind speed for the net power at the rotor. Accurate and low cost hydraulic pressure transducers are readily available, making the control based on the measurement of hydraulic pressure practical and cost effective.

While the invention has been described using an example of a wind turbine application, the power generating system and hydraulic control system HCS could be applied to any other rotor or turbine driven power generating source wherein turbulence-induced torque fluctuations must be accommodated and/or mechanical variable speed is desirable for improved energy capture. Tidal stream generators are a further example of such power generation sources.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

The invention claimed is:

1. A hydraulic control system for controlling a variable ratio transmission of a power generating system, the power generating system including a rotor or turbine adapted to be driven by a fluid at variable speed and an electrical generator adapted to be driven at a constant or variable speed, the transmission coupling the rotor or turbine to the electrical generator, the hydraulic control system comprising:
a hydraulic motor/pump unit adapted to be operably connected to a superposition gear of the variable ratio transmission;
said hydraulic motor/pump unit connected to a hydraulic circuit that comprises an orifice and/or a relief valve configured to open at a predetermined hydraulic pressure, the hydraulic circuit configured to switch between a variable low-speed operating mode and a torque limiting high-speed operating mode,
wherein in the torque limiting high-speed operating mode the hydraulic motor/pump unit is adapted to be driven by the superposition gear and operates as a pump to drive hydraulic fluid through the orifice and/or relief valve to provide a passive torque limiting function, and
wherein in the variable low-speed operating mode the hydraulic motor/pump unit is adapted to be driven as a motor to drive the superposition gear and the hydraulic control system is configured to provide a desired rotor speed by controlling hydraulic fluid flow rate through the hydraulic motor/pump unit.

2. The hydraulic control system as claimed in claim 1, wherein the hydraulic motor/pump unit is of a positive displacement type.

3. The hydraulic control system as claimed in claim 1, wherein the hydraulic circuit is configured to switch between the variable low-speed operating mode and the torque limiting high-speed operating mode in response to measured hydraulic pressure in the hydraulic circuit or otherwise in response to measured torque on the transmission.

4. The hydraulic control system as claimed in claim 1, wherein the hydraulic fluid flow rate through the hydraulic motor/pump unit is controlled in the variable low-speed operating mode in response to measured hydraulic pressure in the hydraulic circuit or otherwise in response to measured torque on the transmission.

5. The hydraulic control system as claimed in claim 1, further comprising a variable displacement supply pump, wherein in the variable low-speed operating mode the variable displacement supply pump is configured to supply fluid to drive the hydraulic motor/pump unit as a motor.

6. The hydraulic control system as claimed in claim 5, wherein the variable displacement supply pump is electrically driven.

7. The hydraulic control system as claimed in claim 1, further comprising a pressure measuring device arranged to measure the pressure in a high pressure region of the hydraulic circuit.

8. The hydraulic control system as claimed in claim 7, wherein the pressure measuring device comprises a transducer.

9. The hydraulic control system as claimed in claim 1, wherein the hydraulic circuit defines a first fluid path and a second fluid path which respectively define fluid flow in the variable low-speed operating mode and the torque limiting high-speed operating mode.

10. The hydraulic control system as claimed in claim 9, wherein the first and second fluid paths are closed loop paths.

11. The hydraulic control system as claimed in claim 9, further comprising a controller configured to switch the hydraulic circuit between the first and second fluid paths, at a predetermined hydraulic pressure.

12. The hydraulic control system as claimed in claim 9, further comprising at least one solenoid valve for switching between the first and second paths.

13. The hydraulic control system of claim 1 in combination with the variable ratio transmission controlled by the hydraulic control system, the variable ratio transmission comprising:
   a transmission input adapted to be driven at a variable speed; and
   a transmission output adapted to be driven at a constant or variable speed.

14. The combination as claimed in claim 13, wherein the variable ratio transmission further comprises a planetary gear arrangement between the transmission input and the transmission output, the planetary gear arrangement comprising a planetary gear input operably connected to the transmission input, a planetary gear output operably connected to the transmission output, and the superposition gear to which the hydraulic motor/pump unit is operably connected.

15. The combination as claimed in claim 13, wherein the power generating system has a rated power, and the power output from the power generating system when in the variable low-speed operating mode is limited to be less than or equal to about 25% of the rated power.

16. The combination as claimed in claim 13, wherein the rotor or turbine has a zero slip speed when the angular velocity of the superposition gear is zero, and the minimum rotor speed in the variable low-speed operating mode is greater than or equal to about 75% of the zero slip speed.

17. The combination as claimed in claim 13, wherein the power generating system has a rated power, and the maximum power required by the hydraulic control system components to achieve the variable low-speed operating mode is less than or equal to about 5% of the power generating system rated power.

18. The combination as claimed in claim 13, wherein the generator is a synchronous generator operating at constant speed set by a larger generating system or grid.

* * * * *